UNITED STATES PATENT OFFICE.

HENRY STALAY ARTHUR HOLT, OF LUDWIGSHAFEN-ON-THE-RHINE, AND OTTO SCHMIDT, OF MANNHEIM, GERMANY, ASSIGNORS TO BADISCHE ANILIN & SODA FABRIK, OF LUDWIGSHAFEN-ON-THE-RHINE, GERMANY, A CORPORATION.

AROMATIC AMMONIUM COMPOUNDS AND PROCESS OF MAKING SAME.

1,036,241. Specification of Letters Patent. Patented Aug. 20, 1912.

No Drawing. Application filed September 27, 1910. Serial No. 584,131.

*To all whom it may concern:*

Be it known that we, HENRY STALAY ARTHUR HOLT and OTTO SCHMIDT, subjects, respectively, of the King of England and the King of Prussia, residing, respectively, at Ludwigshafen-on-the-Rhine and Mannheim, Germany, doctors of philosophy and chemists, have invented new and useful Improvements in Aromatic Ammonium Compounds and Processes of Making Same, of which the following is a specification.

Our invention relates to the manufacture and production of new aromatic ammonium compounds which contain at least one aralkyl residue, which residue contains at least one acid group capable of forming a salt. Under the expression "acid group capable of forming a salt" we include a sulfonic acid group and a carboxylic acid group, either in the free form or otherwise.

Our new compounds can be obtained, for instance, by reacting on a tertiary amino compound with a halogen aralkyl compound which contains the halogen in the side chain and which also contains a group capable of forming a salt, such for instance as a sulfonic acid group and a carboxylic acid group. If, instead of the free sulfonic acid or the free carboxylic acid, the esters thereof be employed, the corresponding derivatives of the aforesaid aralkyl ammonium sulfonic acids, or aralkyl ammonium carboxylic acids, can be obtained. The ammonium compounds containing a sulfonated aralkyl residue can also be produced by treating the corresponding ammonium compound with a sulfonating agent, such for instance as concentrated sulfuric acid. According to the energy with which the sulfonating agent is allowed to react, either one, or more than one, sulfonic acid group can be introduced into the said ammonium compound, but at least one sulfonic acid group must always be introduced into the aralkyl residue. If desired, a monosulfonic acid of an aralkyl ammonium compound which has been prepared, for instance, by combining an aralkyl haloid with a tertiary amin monosulfonic acid containing the sulfonic acid group in an aryl residue, can be treated with a suitable sulfonating agent and in this manner a sulfonic acid group is introduced into the aralkyl residue. As instances of the new compounds which can be produced according to our invention we mention the products obtainable by treating benzyl-chlorid-sulfonic-acid with dimethyl-anilin, or by treating benzyl-chlorid-para-carboxylic acid with dimethyl-anilin, or by acting with a sulfonating agent on the compounds produced by condensing a trialkyl-amin or a dialkyl-aryl-amin with benzyl chlorid, or a homologue or an analogue thereof, or with a substitution product of any of these compounds, and as particular instances we mention dimethyl-phenyl-benzyl-ammonium chlorid (*Berichte*, 10, p. 2079), trimethyl-benzyl-ammonium chlorid (*Journal of the Chemical Society*, 57, p. 778), and also naphthalene-trimethyl-phenyl-ammonium chlorid (obtainable by condensing together omega-chlor-beta-methyl-naphthalene and dimethyl-anilin) and further the compounds obtainable by reacting with benzyl chlorid on tetra-methyl-diamino-diphenyl-methane or on leuco-malachite green.

Our new compounds are characterized by being colorless and crystallizable bodies, which contain nitrogen and an aralkyl residue to which at least one acid group capable of forming a salt is attached, and further they react with indigo white to form yellow compounds which are soluble in dilute alkali. From their chemical behavior the sulfonic acids appear generally to be inner anhydrids between a sulfonic acid group and the hydroxyl group of the ammonium compounds, and we wish to be understood as claiming our new compounds whether the acid group capable of forming a salt be in the free form, or whether it be masked in any way, for instance, by the formation of an inner anhydrid as aforesaid. Our new compounds can be conveniently brought on the market in the form of their salts, or esters, or anhydrids, for instance the disulfonic acid of dimethyl-phenyl-benzyl-ammonium chlorid can be employed in the form in which one of the sulfonic acid groups is neutralized with calcium, while the other takes part in the formation of an inner anhydrid.

The following examples will serve to illustrate further the nature of our invention and how it can be carried into practical effect, but the invention is not confined to these examples. The parts are by weight.

Example 1: Mix together twenty and seven-tenths parts of benzyl-chlorid-para-sulfonic acid and twenty-one parts of di-methyl-anilin, and heat the mixture for from seven to eight hours at from seventy to eighty degrees centigrade. The clear liquid solidifies to a hard crystalline mass. Allow it to cool and remove the dimethyl-anilin hydrochlorid, as well as any excess of dimethyl-anilin, by means of warm alcohol. The residue consists of a white powder which is easily soluble in water, but is insoluble in ether and alcohol, and according to analysis appears to possess a constitution corresponding to the formula:

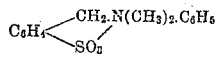

Example 2: Heat together, for from seven to eight hours, at from sixty to seventy degrees centigrade, thirty-four parts of di-methyl-anilin, and seventeen parts of benzyl chlorid carboxylic acid, obtainable from para-toluic acid chlorid by chlorinating, while hot, in the absence of chlorin carriers, and then saponifying the benzyl chlorid carboxylic acid chlorid with ninety-six per cent. sulfuric acid at zero centigrade. When the mixture is cold, break it up into small pieces and extract, by means of ether, any excess of dimethyl-anilin. The product is easily soluble in water and in alcohol, but is insoluble in ether. It can be recrystallized from a mixture of ether and alcohol and thus be obtained in the form of needles which melt at one hundred and fifty-one degrees centigrade under decomposition. Instead of dimethyl-anilin, other tertiary amins can be employed.

Example 3: Introduce two hundred and fifty parts of dimethyl-phenyl-benzyl-ammonium chlorid, without cooling, into seventy parts of ninety-seven per cent. sulfuric acid, allowing the hydrochloric acid which is evolved to escape, and then pass a current of dry air through the solution, in order to remove the remainder of the hydrochloric acid. Add gradually, seven hundred parts of fuming sulfuric acid containing twenty-three per cent. of free $SO_3$, maintaining the temperature between twenty-five and thirty degrees centigrade, then heat the mixture for a short time, on the water-bath, cool, and pour on to ice and remove the sulfuric acid by means of lime. Evaporate the filtrate to a small volume, whereupon the anhydrid of dimethyl-phenyl-benzyl-ammonium-hydroxy-sulfonic acid separates out in large colorless crystals. It melts at a high temperature, is insoluble in alcohol, but is fairly easily soluble in water. In a similar manner, other aromatic ammonium bases, or their salts, can be sulfonated, such for instance as the compound obtainable from benzyl chlorid and tetra-methyl-di-amino-diphenyl-methane, or the compound obtainable from benzyl chlorid and leuco malachite green.

Example 4: If, in the foregoing Example 3, instead of seven hundred parts of fuming sulfuric acid containing twenty-three per cent. of free $SO_3$, four hundred and twenty-five parts of acid containing seventy per cent. of free $SO_3$, be employed, the disulfonic acid of dimethyl-phenyl-benzyl-ammonium hydroxid can be obtained. Probably anhydrid formation takes place between one sulfonic acid group and the ammonium hydroxid group. This acid and its salts are very easily soluble in water and can be obtained from their solution by evaporation.

Example 5: Introduce two hundred and ninety-one parts of dimethyl-phenyl-benzyl-ammonium sulfonic acid anhydrid (obtainable from dimethyl-anilin-meta-sulfonic acid and benzyl chlorid) into seven hundred parts of fuming sulfuric acid containing twenty-three per cent. of free $SO_3$, and heat for some time at from one hundred to one hundred and ten degrees centigrade. After cooling, pour the mixture into water, neutralize with lime and evaporate the filtrate to dryness, whereupon a calcium salt of dimethyl-phenyl-benzyl-ammonium hydroxid disulfonic acid is obtained. This acid is probably isomeric with that obtainable according to the foregoing Example 4.

Now what we claim is:—

1. As new compositions of matter aromatic quaternary ammonium compounds containing at least one aralkyl residue, which residue contains at least one acid group capable of forming a salt, which new compounds are colorless and crystallizable bodies, containing nitrogen, and which react with indigo white to form yellow compounds which are soluble in dilute alkali.

2. As new compositions of matter aromatic quaternary ammonium compounds containing at least one aralkyl residue, which residue contains at least one sulfonic acid group, which new compounds are colorless and crystallizable bodies, containing nitrogen, and which react with indigo white to form yellow compounds which are soluble in dilute alkali.

3. As a new composition of matter, dimethyl-phenyl-benzyl-ammonium-hydroxid-sulfonic-acid anhydrid which is colorless and easily soluble in water, which contains nitrogen and sulfur, and which reacts with indigo white to form a yellow compound which is soluble in dilute alkali.

4. The process of producing aromatic quaternary ammonium compounds containing at least one aralkyl residue, which residue contains at least one sulfonic acid group, by reacting with a sulfonating agent on a quaternary ammonium compound which contains at least one aralkyl residue.

5. The process of producing a sulfonic acid derivative of dimethyl-phenyl-benzyl-ammonium hydroxid by treating dimethyl-phenyl-benzyl-ammonium chlorid with a sulfonating agent.

6. The process of producing dimethyl-phenyl-benzyl-ammonium-hydroxid-disulfonic-acid-anhydrid by acting on dimethyl-phenyl-benzyl-ammonium chlorid with sulfuric acid containing seventy per cent. of free $SO_3$ substantially as hereinbefore described.

In testimony whereof we have hereunto set our hands in the presence of two subscribing witnesses.

HENRY STALAY ARTHUR HOLT.
OTTO SCHMIDT.

Witnesses:
J. ALEC. LLOYD,
JOSEF PFEIFFER.